Figure 1:
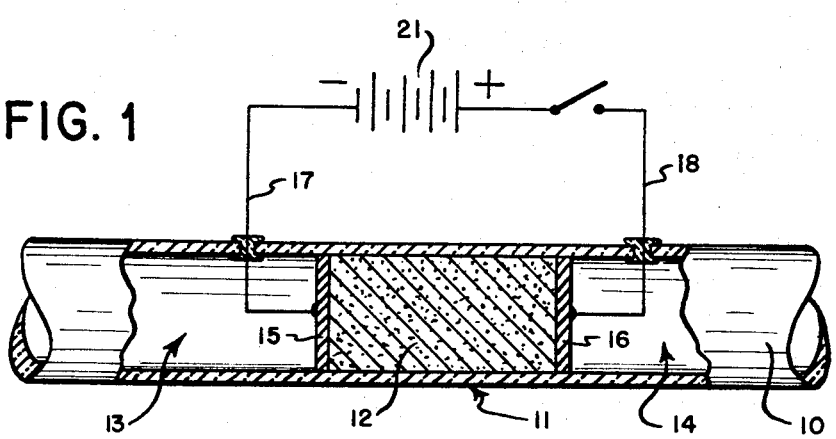

Dec. 17, 1968      R. B. HOLDEN      3,417,009

ELECTROCHEMICAL DEVICE FOR TRANSFERRING HYDROGEN

Filed Oct. 22, 1965

INVENTOR
Robert B. Holden
BY
Pennie, Edmonds, Morton, Taylor & Adams
ATTORNEYS

United States Patent Office 3,417,009
Patented Dec. 17, 1968

3,417,009
ELECTROCHEMICAL DEVICE FOR
TRANSFERRING HYDROGEN
Robert B. Holden, Orange, Conn., assignor to United
Nuclear Corporation, a corporation of Delaware
Filed Oct. 22, 1965, Ser. No. 501,138
14 Claims. (Cl. 204—299)

This invention relates to an electrochemical device for transferring hydrogen from one compartment to another compartment of the device, the device utilizing certain metal hydrides that conduct electricity by the movement of hydride ions therethrough to effect the aforesaid transfer of hydrogen.

There exists in the electronic, nuclear and related arts a need for a simple and reliable means for removing elemental hydrogen quantitatively from a vessel or substance containing the hydrogen and for transferring or pumping the hydrogen to another vessel or substance. For example, the presence of hydrogen in many of the liquid and solid materials employed in the aforementioned arts has a deleterious effect on the desired properties of these materials, and it is necessary to reduce or substantially completely remove hydrogen from these materials. In other situations hydrogen is a required or desirable constituent of the material, and it is necessary to introduce hydrogen into the material in order to build up the concentration of pressure of hydrogen therein. Chemical means or procedures have heretofore been employed to accomplish these ends. However, such chemical procedures have not been entirely satisfactory, and after an extensive investigation into this problem I have devised a new electrochemical device which utilizes the ionic conductivity of certain metal hydrides to effect the transfer of hydrogen from one vessel or material to another vessel or material.

Substances which conduct electricity by the movement of ions, rather than by the movement of electrons, therethrough are said to be ionic conductors. Certain metal hydrides which are known as the "saline" or "salt-like" hydrides have been found to be ionic conductors of electricity; that is, they have been found to be capable of conducting an electric current by the movement of hydride ions (H⁻ ions) therethrough. It has also been found that when an electric current is passed through a saline hydride, gaseous hydrogen present at the cathode can be electrolytically reduced to form hydride ions and that an equivalent amount of hydrogen gas is liberated at the anode according to the half cell reactions:

(1) 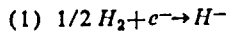
(2) 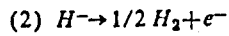

In the course of the aforementioned investigation I further discovered that saline hydrides can be employed to remove elemental hydrogen from hydrogen-containing substances and to introduce elemental hydrogen into other substances, and in accordance with this discovery I have devised a device for transferring or removing hydrogen from one compartment of the device and transferring this hydrogen to a second compartment of the device. My new electrochemical device for transferring hydrogen from one compartment to another comprises an electrolyte chamber containing a saline hydride electrolyte which conducts electricity by the movement of hydride ions therethrough, a cathode in electrical contact with one surface of the saline hydride electrolyte, an anode in electrical contact with a second surface of the saline hydride electrolyte, and a source of electric current electrically connected to the cathode and the anode. The cathode and the anode are both formed of an electrically conductive material which is permeable with respect to hydrogen and which is inert with respect to the saline hydride electrolyte with which it is in contact. A cathode compartment communicates with the cathode, the cathode compartment being adapted to contain a hydrogen-containing material from which hydrogen is removed when the device is in operation, and an anode compartment communicates with the anode of the device, the anode compartment being adapted to contain a material into which hydrogen is introduced when the device is in operation. The cathode compartment and the anode compartment are separated by the saline hydride electrolyte contained in the electrolyte chamber of the device.

Figure 2:
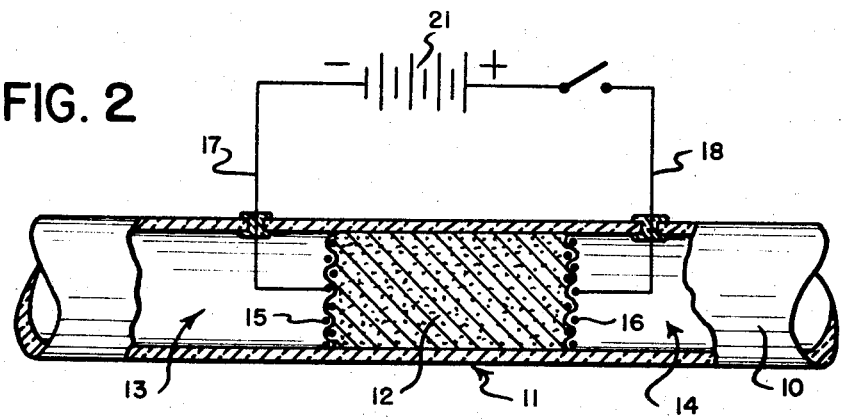
Figure 3:
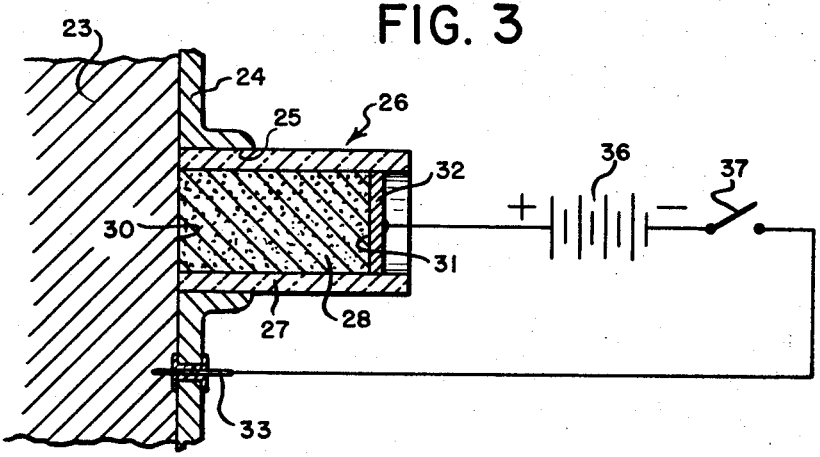

My new device for transferring hydrogen from one compartment to another compartment of the device will be better understood from the following detailed description thereof in conjunction with the accompanying drawing of which FIG. 1 is a cross-sectional view of an advantageous embodiment of the device, FIG. 2 is a cross-sectional view of a modification of the device shown in FIG. 1, and FIG. 3 is a cross-sectional view of a modification of the device that is specifically adapted to remove hydrogen from molten sodium.

In the advantageous embodiment of my new apparatus shown in FIGS. 1 and 2, a cylindrical vessel 10 fabricated from an electrically insulating material, for example a length of glass tubing, is divided longitudinally into an electrolyte chamber 11 filled with a saline hydride electrolyte 12, for example lithium hydride, a cathode compartment 13 adapted to contain a source of elemental hydrogen or a material from which elemental hydrogen is to be removed, and an anode compartment 14 adapted to contain a gaseous, solid or liquid material into which elemental hydrogen is to be introduced. A cathode 15 formed from an electrically conductive material that is permeable with respect to elemental hydrogen is in electrical contact with one surface of the saline hydride electrolyte 12, and an anode 16 also formed from electrically conductive material that is permeable with respect to elemental hydrogen is in electrical contact with another surface of the electrolyte. The cathode 15 and the anode 16 are electrically connected by means of electric leads 17 and 18 to the cathodic pole and the anodic pole, respectively, of a source of electrolyzing current 21.

The saline hydrides employed as the electrolyte 12 in my device are ionic compounds formed from a metal cation and a hydride anion, the hydride ion resembling a halogen in the compound. As previously mentioned, when an electric current is passed through a saline hydride, atoms of hydrogen gas in contact with the cathode are converted to hydride ions and gaseous hydrogen is evolved at the anode. It is this unique property of the saline hydrides that is made use of in the electrochemical device of my invention. Specifically, the saline hydrides useful in the practice of my invention are those which conduct electricity predominantly by the movement of hydride ions therethrough. These hydrides comprise the alkali metal hydrides (lithium, sodium, potassium, rubidium and cesium hydrides), the more electropositive of the alkaline earth metal hydrides (calcium, strontium and barium hydrides), and mixtures of these hydrides. Of these I presently prefer to use lithium hydride, or calcium hydride containing a minor quantity of lithium hydride, as the saline hydride electrolyte component of my device. With specific reference to the latter mixture of saline hydrides, I have found that the addition of a small amount of a univalent cationic material, such as lithium in the form of lithium hydride, to a divalent saline hydride, such as calcium hydride, will generate a concentration of hydride ion (H⁻) vacancies in the CaH₂ crystal lattice approximately equal to the lithium concentration in the mixture, and further that the electrical conductivity of the hydride increases as the anionic vacancy increases.

The cathode 15 and the anode 16 that are in electrical contact with the saline hydride electrolyte 12 must not only be electrically conductive, but these electrodes must also be permeable with respect to elemental hydrogen and inert with respect to both the saline hydride employed as the electrolyte and the hydrogen-containing material or atmosphere contained in the cathode and anode compartments. If the hydrogen-containing material in either the cathode compartment 13 or the anode compartment 14 is itself electrically conductive and is inert with respect to the saline hydride electrolyte, it may serve as the cathode or the anode (as the case may be) of the device. Similarly, if the hydrogen-containing material in either the cathode or the anode compartment is inert with respect to the saline hydride electrolyte but is not a conductor of electricity, the cathode 15 or the anode 16 (as the case may be) may be formed of metal screen or mesh, or may be formed from sheet metal that is provided with a plurality of small openings or perforations, which (as clearly shown in FIG. 2) permits the hydrogen-containing material to come into physical and electrical contact with both the metal electrode and the contacting surface of the saline hydride electrolyte 12. If, on the other hand, the hydrogen-containing material in either the cathode or the anode compartment is not inert with respect to the saline hydride electrolyte, that is, if it either chemically attacks or physically dissolves the saline hydride, the cathode 15 (or the anode 16, as the case may be) must be formed from a solid sheet of an electrically conductive material, such as palladium or zirconium, which is permeable with respect to elemental hydrogen as well as being inert to both the saline hydride electrolyte and the aforementioned hydrogen-containing material. When the cathode 15 comprises a layer of palladium (or other inert metal permeable to hydrogen) that separates the hydrogen-containing material in the cathode compartment 13 from the saline hydride in the electrolyte chamber 11, elemental hydrogen contained in the hydrogen-containing material in the cathode compartment diffuses into the layer of palladium and migrates to the interface of the cathode 15 and the saline hydride electrolyte 12 where the hydrogen atoms are electrolytically reduced to hydride ions. In like manner, when the anode 16 comprises a layer of palladium (or other inert metal permeable to hydrogen), elemental hydrogen evolved by the electrolytic oxidation of hydride ions at the interface of the saline hydride electrolyte 12 and the palladium anode 16 diffuses into the metal anode and migrates to the outer surface thereof where it enters the hydrogen-containing material in the anode compartment 14.

The embodiment of my device shown in FIG. 3 of the drawing is specifically adapted to remove hydrogen from liquid metals (such as liquid sodium employed as a heat exchange medium in nuclear reactors) the hydrogen content of which must be maintained at as low a concentration as possible. The hydrogen-containing liquid metal 23 circulates through a suitable container or conduit one wall 24 of which is formed with an opening 25 adapted to receive the electrochemical device 26 of my invention. The device 26 comprises a cylindrical body 27 formed of an electrically insulating material one end of which body 27 is received in the opening 25 formed in the wall 24. A solid saline hydride electrolyte 28 that is chemically and physically inert with respect to the molten metal 23 is disposed in the electrolyte chamber of the cylindrical body 27. The inner surface 30 of the solid saline hydride electrolyte 28 is in direct contact with the liquid metal 23 which serves as the cathode of the device, and the outer surface 31 of the electrolyte 28 is in contact with a palladium anode 32. An electric lead 33 extends through an insulating bushing in the wall 24, the inner end of the lead 33 being in electrical contact with the liquid metal 23. The cathode (that is, the hydrogen-containing liquid metal 23) and the anode 32 are electrically connected to the cathodic and anodic poles, respectively, of a source of electrolyzing current 36.

When the switch 37 is closed an electrolyzing current is caused to flow from the hydrogen-containing liquid metal 23 through the solid saline hydride electrolyte 28 to the anode 32. The aforesaid flow of electrolyzing current effects the electrolytic reduction of hydrogen atoms to hydride ions at the interface of the liquid metal 23 and the saline hydride electrolyte 28, and the electrolytic oxidation of hydride ions to elemental hydrogen at the interface of the electrolyte 28 and the anode 32. The hydrogen gas liberated at the interface of the electrolyte 28 and the anode 32 diffuses into the palladium metal anode 32 and migrates therethrough to the outer surface of this anode where the hydrogen escapes into the gaseous environment adjacent thereto.

From the foregoing description of my electrochemical device for removing elemental hydrogen from hydrogen-containing substances and for introducing elemental hydrogen into a second substance or environment, it will be seen that I have made an important contribution to the art to which my invention relates.

I claim:

1. An electrochemical device for removing hydrogen from a hydrogen-containing material and for introducing hydrogen into a second material which comprises an electrolyte chamber containing a saline hydride electrolyte which conducts electricity by the movement of hydride ions therethrough, a cathode in electrical contact with one surface of said saline hydride electrolyte, said cathode comprising an electrically conductive material which is permeable with respect to hydrogen and which is inert with respect to the saline hydride electrolyte with which it is in contact, an anode in electrical contact with a second surface of the saline hydride electrolyte, said anode being formed from an electrically conductive material which is permeable with respect to hydrogen and which is inert with respect to the saline hydride electrolyte with which it is in contact, and a source of electric current electrically connected to said cathode and to said anode.

2. The electrochemical device according to claim 1 in which the saline hydride electrolyte consists essentially of at least one alkali metal hydride or alkaline earth metal hydride selected from the group consisting of lithium hydride, sodium hydride, potassium hydride, rubidium hydride, cesium hydride, calcium hydride, barium hydride and strontium hydride.

3. The electrochemical device according to claim 1 in which the saline hydride electrolyte consists essentially of lithium hydride.

4. The electrochemical device according to claim 1 in which the saline hydride electrolyte consists essentially of solid calcium hydride containing a minor amount of lithium hydride.

5. The electrochemical device according to claim 1 in which the cathode comprises an electrically conductive fluid in which hydrogen is soluble and which is inert chemically and physically with respect to the saline hydride electrolyte with which it is in contact.

6. The electrochemical device according to claim 1 in which the cathode comprises a fluid-pervious layer of electrically conductive material which is inert chemically and physically with respect to the saline hydride electrolyte with which it is in contact.

7. The electrochemical device according to claim 1 in which the cathode comprises a hydrogen-permeable layer of electrically conductive material which is inert chemically and physically with respect to the saline hydride electrolyte with which it is in contact.

8. An electrochemical device for removing hydrogen from a hydrogen-containing material and for introducing hydrogen into a second material which comprises an electrolyte chamber containing a saline hydride electrolyte which conducts electricity by the movement of hydride ions therethrough, a cathode in electrical contact with one surface of said saline hydride electrolyte, said cathode comprising an electrically conductive material which is permeable with respect to hydrogen and which is inert with respect to the saline hydride electrolyte with which it is in contact, an anode in electrical contact with a second surface of the saline hydride electrolyte, said anode being formed from an electrically conductive material which is permeable with respect to hydrogen and which is inert with respect to the saline hydride electrolyte with which it is in contact, a source of electric current electrically connected to said cathode and to said anode, a cathode compartment communicating with said cathode, said cathode compartment being adapted to contain a hydrogen-containing material from which hydrogen is removed when the device is in operation, and an anode compartment communicating with the anode of the device, said anode compartment being adapted to contain a material into which hydrogen is introduced when the device is in operation, the cathode compartment and the anode compartment being separated by the saline hydride electrolyte in the electrolyte chamber of the device.

9. The electrochemical device according to claim 8 in which the saline hydride electrolyte consists essentially of at least one alkali metal hydride or alkaline earth metal hydride selected from the group consisting of lithium hydride, sodium hydride, potassium hydride, rubidium hydride, cesium hydride, calcium hydride, barium hydride and strontium hydride.

10. The electrochemical device according to claim 8 in which the saline hydride electrolyte consists essentially of lithium hydride.

11. The electrochemical device according to claim 8 in which the saline hydride electrolyte consists essentially of solid calcium hydride containing a minor amount of lithium hydride.

12. The electrochemical device according to claim 8 in which the cathode comprises an electrically conductive fluid in which hydrogen is soluble and which is inert chemically and physically with respect to the solid saline hydride electrolyte with which it is in contact.

13. The electrochemical device according to claim 8 in which the cathode comprises a fluid-pervious layer of electrically conductive material which is inert chemically and physically with respect to the saline hydride electrolyte with which it is in contact.

14. The electrochemical device according to claim 8 in which the cathode comprises a hydrogen-permeable layer of electrically conductive material which is inert chemically and physically with respect to the saline hydride electrolyte with which it is in contact.

References Cited
UNITED STATES PATENTS

| | | | |
|---|---|---|---|
| 1,235,064 | 7/1917 | Schwerin | 204—180 |
| 2,882,212 | 4/1959 | Beard | 204—195 |
| 3,160,797 | 12/1964 | Kanai | 204—180 |
| 3,297,551 | 1/1967 | Alcock | 204—1.1 |

HOWARD S. WILLIAMS, *Primary Examiner.*

T. TUNG, *Assistant Examiner.*

U.S. Cl. X.R.

204—180, 1